June 19, 1928.
R. W. SHARP
SUGAR CANE MILL
Original Filed June 4, 1924
1,673,921
2 Sheets-Sheet 1
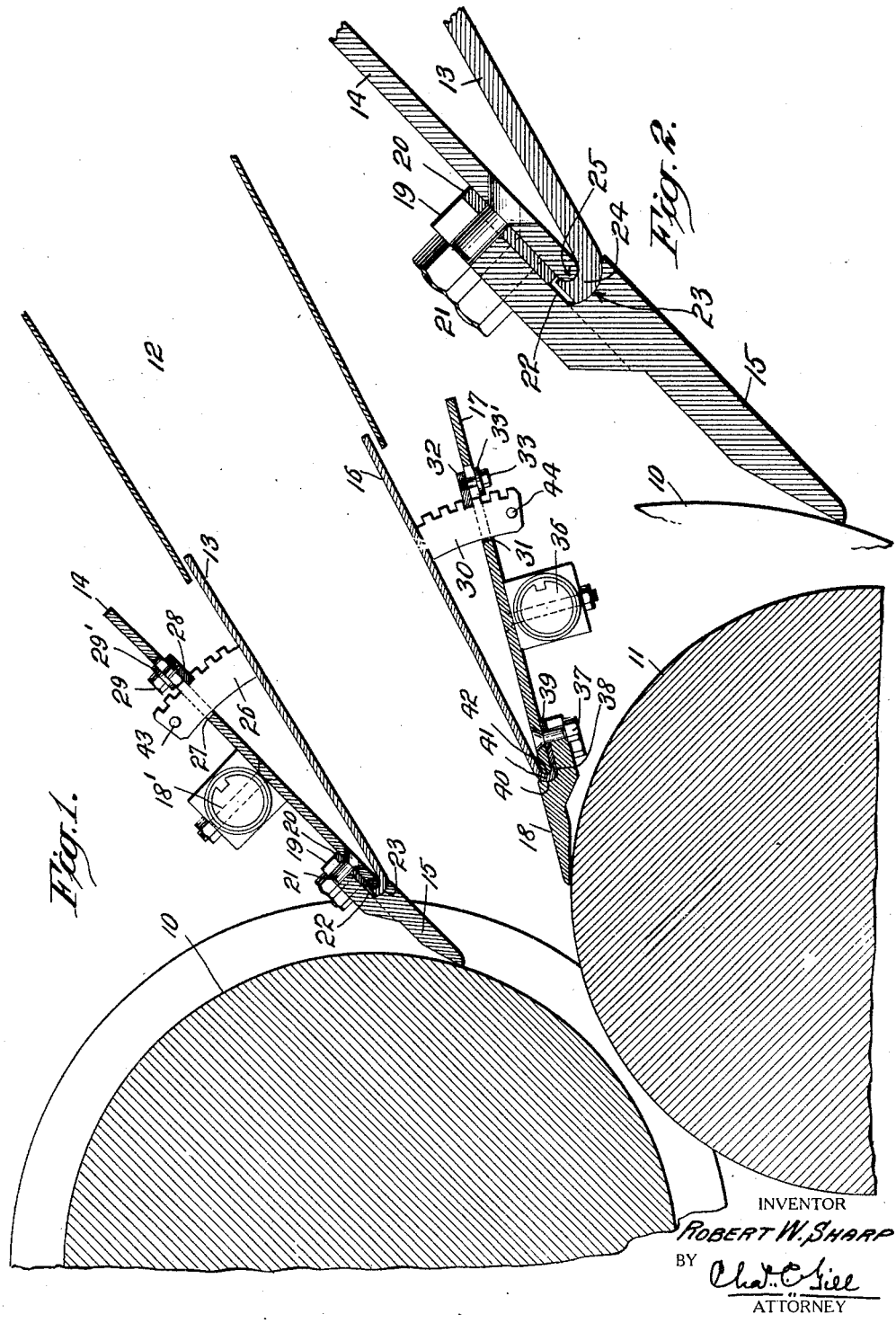
INVENTOR
ROBERT W. SHARP
BY
Chas. C. Gill
ATTORNEY

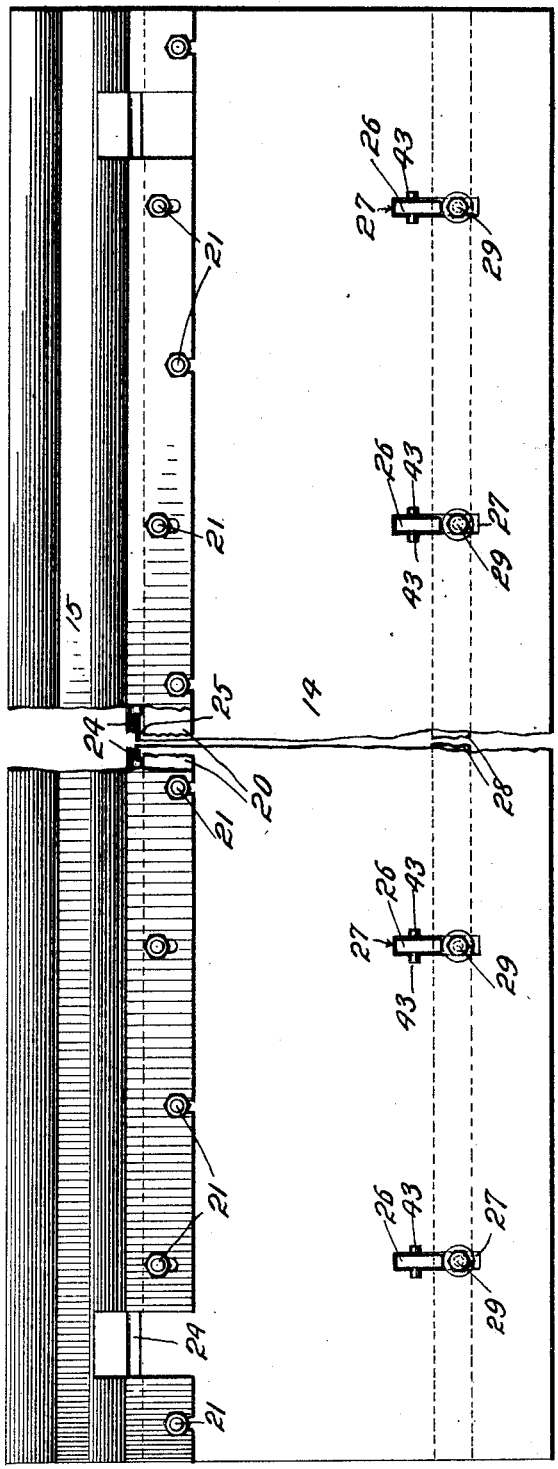

Patented June 19, 1928.

1,673,921

UNITED STATES PATENT OFFICE.

ROBERT W. SHARP, OF BATON ROUGE, LOUISIANA.

SUGAR-CANE MILL.

Application filed June 4, 1924, Serial No. 717,680. Renewed November 27, 1926.

The invention relates to the carriers or chutes disposed between the macerating or expressing rollers of adjacent sugar-cane mills arranged in series, and it consists in a novel construction of the end portion of the carrier or chute embodying an adjustable top feed plate, and also, if desired, an adjustable bottom feed plate, and an adjustable upper or scraper plate carrying a scraper toe to engage the upper roller of the mill, and also, if desired, an adjustable lower or scraper plate carrying a scraper toe to engage the lower adjacent roller of the mill.

The object of the invention is to provide means for maintaining a predetermined relation between the upper and lower feed plates so that regardless of wear on the scraper toes and the adjustment of the scraper plates carrying them, there shall be secured a spacing between the upper ends of said plates of, say, two or three inches greater than the spacing at said toes, my invention permitting me to maintain this spaced relation of the feed plates as the scraper toes wear down.

A further object of my invention is to obviate certain objections to modern bagasse carriers in that therein there has been no such adjusted relation of the feed plates as indicated hereinbefore, with the result that the rapid wear of the scraper toes soon leaves the spacing between the upper ends of the feed plates about the same as that between the toe ends of said plates, this rendering the feed difficult and irregular and impairing the operation and straining the equipment. To overcome or lessen the difficulties just mentioned, the scraper toes have had to be frequently renewed and this has caused considerable delay and expense.

The relative adjustment of the feed plates provided by my invention renders it possible to secure a bagasse feed of any desired thickness throughout an entire season without any renewal of the scraper toes and with improved milling efficiency and minimum strain and wear on the equipment.

The invention will be fully understood from the detailed description hereinafter presented, reference being had to the accompanying drawings, in which:

Fig. 1 is a longitudinal section through one end portion of a bagasse carrier or chute embodying my invention, the same being shown in proper relation to the rollers of a sugar-cane mill, which rollers are shown partly broken away and in section;

Fig. 2 is a similar section, partly broken away and on a larger scale, through the top feed plate and upper scraper plate with its semi-steel toe in engagement with the upper roller of the mill, a fragment of said roller being shown, and Fig. 3 is a detached top view, partly broken away, of the upper scraper plate and its scraper toe.

In the drawings, 10 designates an upper roller of a sugar-cane mill, 11 one of the lower rollers thereof, 12 a portion of the main body of the chute through which the blanket of bagasse is delivered to the succeeding mill, 13 the upper or top feed-plate, 14 the upper scraper plate carrying the scraper toe 15 in engagement with the upper roller, 16 the bottom feed plate, 17 the lower scraper plate and 18 the scraper toe carried by the plate 17 to engage the roller 11.

My invention resides in the plates 13, 14, 16, 17 and features connected therewith, the rollers of the mill and the body 12 of the chute or carrier being of any usual or suitable construction.

The top feed plate 13 constitutes a portion of the chute or carrier 12 but is independent thereof to the extent that while remaining a portion of the chute or carrier, it may be adjusted with relation to the bottom feed plate 16 whether said bottom plate is always stationary or provided with means for its adjustment. The upper scraper plate 14 is a flat plate about equal in dimensions with the plate 13, and said two plates diverge upwardly from each other. The plate 14 has bolted to its lower edge portion the semi-steel scraper toe 15, which inclines downwardly toward and engages the roller 10, and said plate 14 is supported from a transverse beam 18' which is swiveled in the side frames of the mill or parts connected therewith and is stationary except that it permits the plate 14 to be adjusted as to its inclination so as to carry the toe 15 against the roller 10. The toe 15 is of considerable body, and its upper portion 19 lies over the lower edge of the plate 14, and between said portion 19 of the toe 15 and the plate 14 there is interposed a steel liner 20. The bolts 21 securing the toe 15 and the lower end of the plate 14 together pass through the liner 20, and their arrangement is clearly indicated in Fig. 3. The toe 15 is recessed, as at 22, to receive the liner 20 and lower edge of the plate 14, and the forward wall 23 of said recess is spaced from the lower edge of the plate 14 and is concavely recessed, as shown in Figs. 1 and 2, to receive the upwardly curved front edge 24 of the plate 13, said end of the plate 13 being of hook formation and bearing against the convex or rounded edge 25 of the plate 14, which construction permits of the plate 13 being given a pivotal action on the forward end of the plate 14.

The plate 13 has secured to its upper surface and somewhat adjacent to its upper edge a series of segmental racks 26 which extend upwardly through slots 27 formed in the plate 14 and are engaged by a latch plate 28 carried by the plate 14, whereby the plate 13 becomes supported from the plate 14 through the latch plate 28 and racks 26 and is adjustable upwardly and downwardly at its upper end portion. The latch plate 28 is indicated by dotted lines in Fig. 3, wherein it will be seen that the latch plate 28 is in one continuous strip and engages all of the racks 26. The latch plate 28 is held by a series of latch screws or bolts 29, which extend through the upper end portions of the slots 27, said slots being elongated for that purpose. On loosening the latch screws 29, said screws and the latch plate 28 may be slid outwardly in a direction from the racks 26, and when the latch plate is in that position the plate 14 may be adjusted to carry the toe 15 properly against the roller 16, and also when the latch plate is in the free condition mentioned, the plate 13 may be lifted upwardly in respect to adjusting it and thereby the passage through the carrier or chute 12. After the plate 14 has received any necessary adjustment and the plate 13 has received such adjustment as it may require owing to the wear on the toe 15, the latch plate is slid back into the racks 26 and the screws 29 are tightened to hold the rack stationary, and thereby hold the plates 13, 14 stationary in their adjusted relation to each other and in the adjustment of the plate 13 to control the vertical diameter of the end portion of the carrier or chute 12. The bottom feed plate 16 may be stationary, if desired, because of the capacity of adjustment of the top feed plate 13 to secure a greater vertical width between its upper end and the upper end of the plate 16 than there may be between the toes 15, 18 where they engage the rollers 10, 11. As the toes 15, 18, wear down the distance between them increases, and then the plate 13 must be adjusted upwardly to compensate for the increased distance which, in use, takes place between the toes 15, 18. The racks 26 and latch plate 28 permit the downward movement of the upper end of the plate 14 to carry the toe 15, as worn, against the roller 10, and the same latch plate and racks permit the upper end of the plate 13 to be adjusted upwardly with each upward adjustment of the toe 15 so as to maintain the proper inclination of said plate 13 with relation to the varying distances between the toes 15, 18.

Preferably the bottom feed plate 16 will be rendered adjustable by means similar to those hereinbefore described with respect to the top plate 13, as I illustrate in Fig. 1, wherein I show the plate 16 as carrying a series of racks 30 extending downwardly through slots 31 in the scraper plate 17 and engaged by a latch plate 32 adjustably secured to the plate 17 by latch screws or bolts 33, these features 30, 31, 32 and 33 corresponding exactly with the features 26, 27, 28 and 29 shown in the upper portion of Fig. 1. The plate 17 is supported by a beam 36 which is rockable to permit the toe 18 to be adjusted with relation to the roller 11. The toe 18 is secured to the plate 17 by a series of bolts 37, and said toe is recessed, as at 38, to receive the lower edge portion of the plate 17 and the steel liner 39. The forward end of the recess 38 is concavely machined, as at 40, to receive the hook-like edge 41 of the plate 16, said edge 41 being hooked upon the adjacent convex edge 42 of the plate 17 and all of these features just referred to duplicating corresponding features hereinbefore described with respect to the plates 13, 14 and toe 15 at the upper side of the end of the carrier or chute. The racks 30 and latch plate 32 permit the plate 17 to be adjusted to keep the toe 18, as the same becomes worn, against the roller 11, and as the spacing between the toes 15, 18 becomes increased, due to the wear and adjustment of said toes toward the rollers 10, 11, the plate 16 at its upper portion may be adjusted downwardly so as to aid in maintaining a greater distance between the upper portions of the plates 13, 16 than the distance between the toes 15, 18.

The racks 26 may be secured to the plate 13 and the racks 30 to the plate 16 by electric welding or otherwise, as may be found convenient. The racks 26 are equipped with cross pins 43 to prevent their escape downwardly through the slots 27 of the scraper plate 14, and the racks 30 are equipped with cross-pins 44 to prevent their escape through the slots 31 of the scraper plate 17.

In the employment of the invention the scraper plates 14, 17, will be turned on their respective supports to position the toes 15, 18 against the respective rollers 10, 11 and secured in their initial adjustment by the latch plate 28 and racks 26 and the latch plate 32 and racks 30, respectively, and care will be exercised to see that at this time the distance between the upper ends of the feed plates 13, 16 is greater than that between the toes 15, 18 and between the lower ends of said feed plates, thus providing at the end of the carrier or chute an inlet passage of gradually increasing capacity. As the toes 15, 18 become worn, they are adjusted, by means of the plates 14, 17, in a direction from each other to keep up their engagement with the rollers 10, 11, and after this adjustment has been repeated a few times the space between the toes and that between the lower ends of the feed plates 13, 16 would become of undue width with relation to the spacing between the upper ends of the feed plates 13, 16 except for the presence of my invention which permits me to adjust the feed plate 13 upwardly at its upper end and the feed plate 16 downwardly at its upper end, as hereinbefore described, to widen the space between said plates at their upper ends in proportion to the increased width of spacing between the toes 15, 18 and between the lower ends of said feed plates, whereby the inlet end of the carrier or chute is maintained in proper form to permit the correct travel of the blanket of bagasse.

It will readily be understood that if the scraper toes were rigid on the ends of the feed plates, instead of having an articulated connection therewith, and the lower ends of said plates had to be turned outwardly from time to time to maintain the toes against the rolls, the upper ends of said feed plates would constantly be brought nearer and nearer together, the result of which would be to choke the passage for the bagasse, whereas with the articulated connection of the toes to the feed plates and the provision of means for the outward adjustment of the upper ends of the feed plates, the passage through the chute is properly maintained and the renewal of the scraper toes is only required after a considerable period of use.

I do not limit my invention to all the details of form and construction hereinbefore specifically described, since I am aware that the same may be modified or varied without departing from the spirit of the invention and within the scope of the appended claims.

What I claim as my invention and desire to secure by Letters Patent, is:

1. An intermediate chute or the like for sugar-cane mills having at its entrance end an upwardly inclined feed plate, a scraper plate diverging outwardly from the lower end thereof, a scraper toe secured to said scraper plate, means supporting said scraper plate and permitting rocking adjustment thereof to carry said toe against a roller of the mill, means articulating the lower ends of said plates to permit independent adjustment of the plates at their upper portions toward and from each other, and means for securing said plates in their adjusted relation to each other.

2. An intermediate chute or the like for sugar-cane mills having at its entrance end top and bottom upwardly inclined feed plates, upper and lower scraper plates diverging outwardly from the lower ends of the respective feed plates, scraper toes secured to said scraper plates to engage the adjacent rollers of the mill, means supporting said scraper plates and permitting rocking adjustment thereof to carry said toes against said rollers, means articulating the top and bottom feed plates with the upper and lower scraper plates respectively, and means for securing the upper and lower feed and scraper plates in their adjusted relation to each other.

3. An intermediate chute or the like for sugar-cane mills as claimed in claim 1, in which the means for securing the feed and scraper plates in adjusted relation comprise racks secured to the feed plate and extending outwardly through slots in the scraper plate, and latch mechanism carried by the scraper plate to engage said racks comprising a latch plate and screws carrying said latch plate and adapted to have sliding movement in said slots to carry the latch plate from and toward the racks, said screws also being adapted to secure the latch plate in firm engagement with said racks.

4. An intermediate chute or the like for sugar-cane mills as claimed in claim 1, in which the scraper toe is recessed to receive the lower edge of the scraper plate, which is rounded, and in which the lower edge of the feed plate is of curved hook-formation and engages the rounded edge of the scraper plate, and in which the end wall of the recess in the scraper toe is concavely rounded to snugly engage the back of the hook on the feed plate.

5. An intermediate chute or the like for sugar-cane mills having at its entrance end a forwardly extending feed plate, an adjustable scraper carrying at its lower end a toe engaging a roller of the mill, means articulating the rear end of the feed plate with said scraper, and means for adjusting the outer position of the forward end portion of the feed plate independently of the scraper during the operation of the mill.

6. An intermediate chute or the like for sugar-cane mills having at its entrance end a forwardly extending feed plate, an adjustable scraper carrying at its lower end a toe engaging a roller of the mill, means articulating the rear end of the feed plate with said scraper, and means for adjusting the outer position of the forward end portion of the feed plate independently of the scraper during the operation of the mill, said feed plate adjusting means being mounted on the scraper.

Signed at city of Caibarien, in the Province of Santa Clara, and Republic of Cuba, this 17th day of May A. D. 1924.

ROBERT W. SHARP.